US007575791B2

(12) United States Patent
Chamandy et al.

(10) Patent No.: US 7,575,791 B2

(45) Date of Patent: Aug. 18, 2009

(54) COMPOSITE LABEL

(75) Inventors: Paul A. Chamandy, Ithaca, NY (US); Theodore S. Pinkard, Sayre, PA (US)

(73) Assignee: Paxar Americas, Inc., Miamisburg, OH (US)

( * ) Notice: Subject to any disclaimer, the term of this patent is extended or adjusted under 35 U.S.C. 154(b) by 693 days.

(21) Appl. No.: 11/185,543

(22) Filed: Jul. 20, 2005

(65) Prior Publication Data

US 2007/0020423 A1 Jan. 25, 2007

(51) Int. Cl.
*B32B 33/00* (2006.01)

(52) U.S. Cl. .................... 428/40.1; 428/41.8; 428/42.2; 428/42.3; 428/346; 428/347; 428/348; 428/349; 283/81

(58) Field of Classification Search ....................... None
See application file for complete search history.

(56) References Cited

U.S. PATENT DOCUMENTS

| | | | | |
|---|---|---|---|---|
| 2002/0056514 | A1* | 5/2002 | Grosskopf et al. | 156/268 |
| 2003/0175508 | A1* | 9/2003 | Franko, Sr. | 428/354 |
| 2003/0175509 | A1* | 9/2003 | Franko, Sr. | 428/354 |
| 2003/0198773 | A1* | 10/2003 | Miekka et al. | 428/41.8 |
| 2003/0201064 | A1* | 10/2003 | Treleaven et al. | 156/250 |

* cited by examiner

*Primary Examiner*—Jennifer McNeil
*Assistant Examiner*—Vera Katz
(74) *Attorney, Agent, or Firm*—Joseph J. Grass

(57) ABSTRACT

There is disclosed a plurality of embodiments of composite webs of labels wherein there are labels on a pressure sensitive pressure-coated carrier web and wherein adhesive deadener coats the adhesive underlying the labels to enable the labels to be releasably adhered to the carrier web while leaving the carrier outside the peripheries of the labels non-tacky.

20 Claims, 6 Drawing Sheets

COMPOSITE LABEL

BACKGROUND OF THE INVENTION

Field of the Invention

Composite labels in web or sheet form.

SUMMARY OF THE INVENTION

This invention relates to an improved composite label construction wherein labels can be readily peeled from a carrier either manually or by an automatic label applicator, and wherein an adhesive deadener on adhesive between the labels and the carrier partially detackifies the adhesive to facilitate ready removal of the labels.

In one specific embodiment, there is a longitudinally extending carrier web with a coating of pressure sensitive adhesive on a face thereof, a patterned adhesive deadener on the pressure sensitive adhesive wherein the patterned coating includes a heavy adhesive deadener coating and a light adhesive deadener coating, labels disposed along the carrier web, wherein at least some of the adhesive deadener coating between the labels and the pressure sensitive adhesive includes the light coating to releasably adhere the labels to the pressure sensitive adhesive on the carrier web, and wherein the adhesive deadener coating outside the peripheries of the labels includes the heavy coating to render the pressure sensitive adhesive outside the peripheries of the labels substantially non-tacky. Another embodiment includes a uniform coating of adhesive deadener on the carrier web, wherein matrix material surrounds the labels. Further embodiments will be evident from the drawings and the following detailed description.

BRIEF DESCRIPTION OF THE DIAGRAMMATIC DRAWINGS

DETAILED DESCRIPTION OF THE PREFERRED EMBODIMENTS

Figure 1:
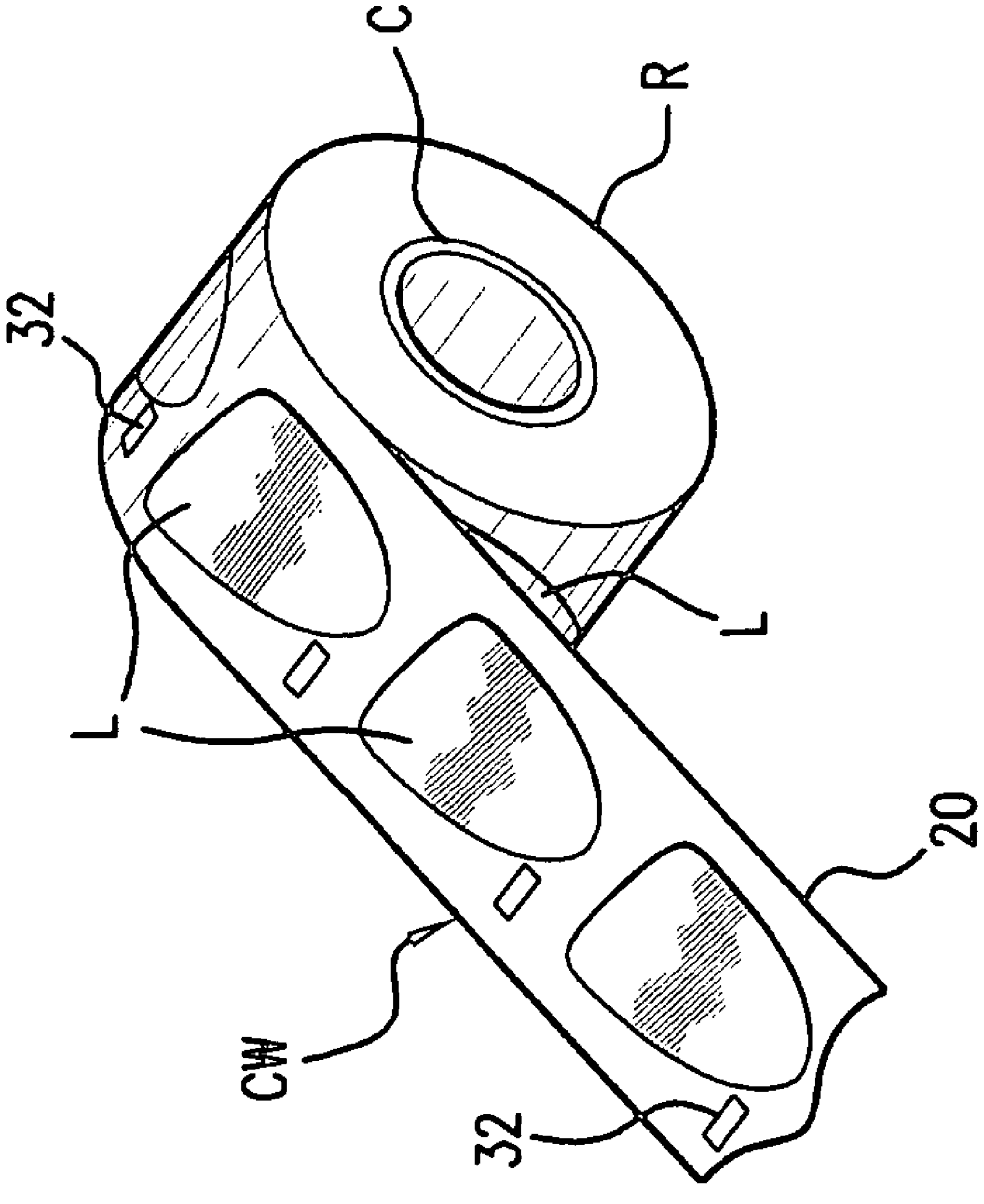
FIG. 1 is a perspective view of a roll of a wound composite label web.

With reference to the embodiment of FIGS. 1 through 5, and initially to FIG. 1, there is shown a roll R of a composite label web CW which is preferably wound onto a core C. The composite web CW includes labels L. FIG. 1 is a general view and applies to each of the disclosed embodiments.

Figure 2:
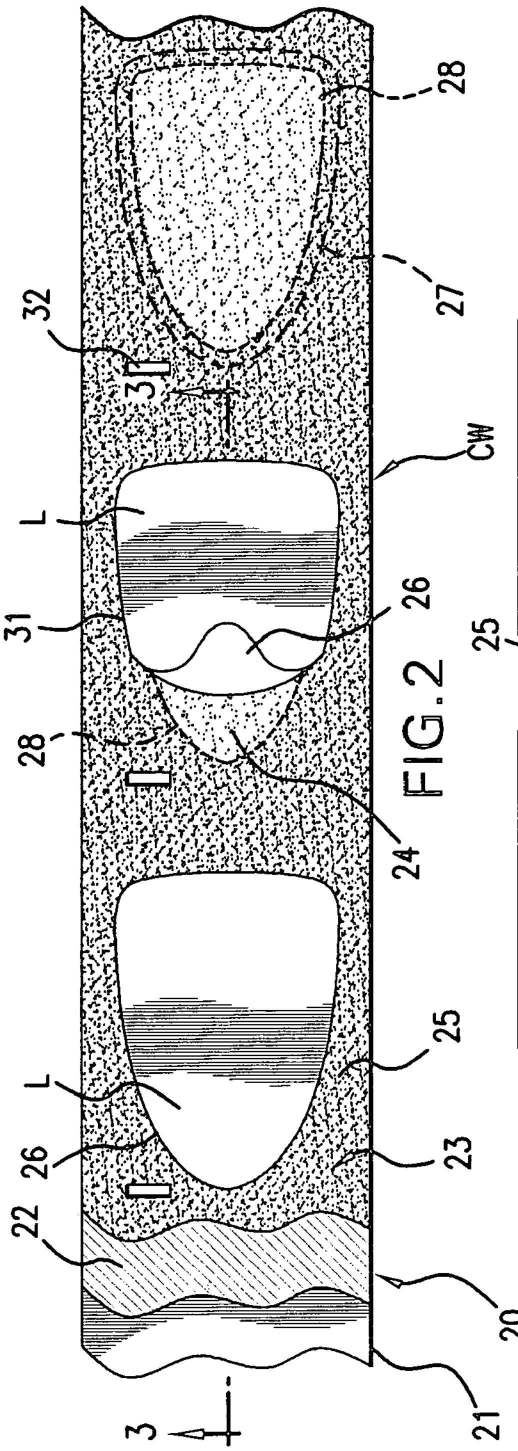
FIG. 2 is a top plan view, partly broken away, of the label web of FIG. 1.
Figure 3:
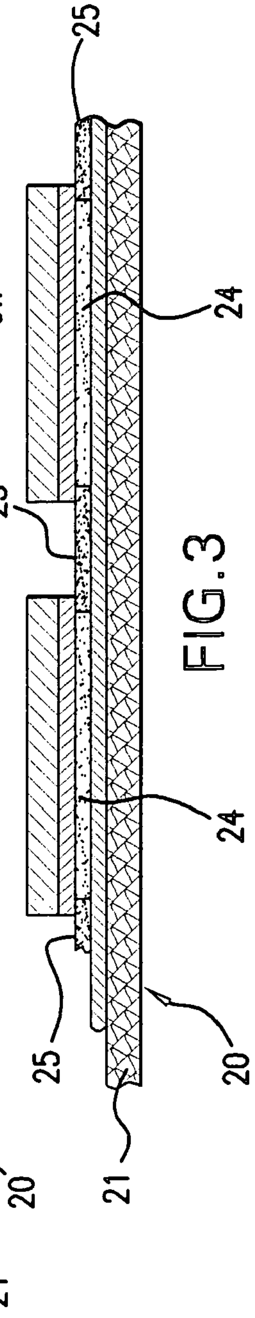
FIG. 3 is a sectional view taken along line 3-3 of FIG. 2.

With reference to FIG. 2 there is shown a carrier generally indicated 20 which comprises a longitudinally extending carrier web 21 coated with a preferably uniform coating of pressure sensitive, that is, tacky adhesive 22 shown by cross-hatching. The carrier web 21 is preferably comprised of the least expensive material such as paper, but it can be comprised of other substrate materials such as plastics film or the like, release liner material, and so on, namely, any material which can serve as a support or substrate for labels L and allows the labels to be removed manually or by an automatic label applicator preferably without tearing the carrier web 21. An adhesive deadener generally indicated at 23 in the form of a coating is applied over the adhesive 22. The adhesive deadener 23 renders the adhesive less tacky and can be applied in a density or densities to provide the predetermined amount of tackiness. In the embodiment of FIGS. 1 through 5, the adhesive deadener 23 is disclosed as being in a patterned coating, namely, a light adhesive deadener coating 24 indicated by light stippling is applied at regularly spaced apart intervals in areas or zones onto the adhesive 22 on the carrier web 21 and a heavy adhesive deadener coating 25 indicated by heavy stippling is applied to the remainder of the adhesive 22 on the carrier web 21. The heavy coating 25 is applied to the adhesive 22 on the carrier web 21 at the area outside the labels L preferably to within the peripheral or outer marginal edges 26 of the labels L. Because the coatings 24 and 25 of the coating 23 render the adhesive 22 slightly tacky and non-tacky, respectively, the coating 23 can be considered to be uneven or of uneven tackiness. The shape of the zones of light coating 24 are preferably similar, but are not congruent with, the shape of the label L, as shown in FIG. 2. It is preferred that the heavy coating 24 extend to within the peripheral or marginal edge 26 of the labels, as shown. FIGS. 2 and 3 show that the labels L are slightly larger in area than the area of the light coating 24. In FIG. 2, this difference in the size of the labels L, shown by a broken line 27, and the size of the light coating 24 shown in the areas bounded by broken line 28, is readily apparent.

The heavy adhesive deadener coating 25 renders the adhesive 22 preferably completely non-tacky so that the composite web CW is easy to handle by users during removal of labels L and when treading through a printer or an automatic labeler, and the composite label web CW can be readily wound into and unwound from a roll without the composite web CW sticking to itself. The light adhesive deadener 24 enables the underlying adhesive 22 to releasably hold the labels L to the carrier web 21 but allows the labels L to be peeled from the partially deadened adhesive 22 when desired. It is apparent that the adhesive deadener coating 24 allows the tackiness of the adhesive-deadener-coated adhesive 22 to be effective to hold the labels to the carrier web with the desired amount of holding force.

Figure 4:
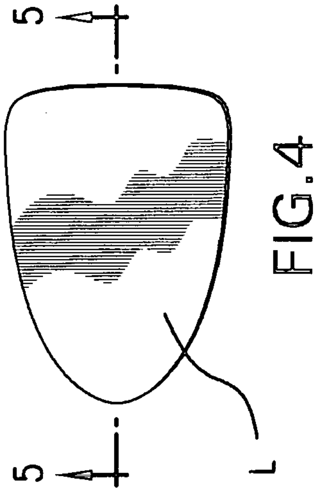
FIG. 4 is a top plan view of a label of the embodiment shown in FIGS. 1 through 3.
Figure 5:
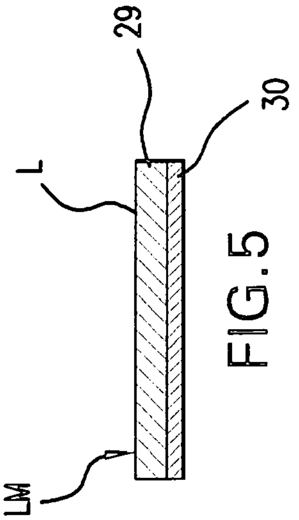
FIG. 5 is a sectional view taken along line 5-5 of FIG. 4.

FIGS. 4 and 5 show a preferred label L comprised of fabric such as a woven polyester material 29 with a heat-seal film or coating 30 of any suitable material, for example a thermoplastic heat-seal adhesive such as polyester. Therefore, when the label L comprised of fabric material 29 has been delaminated from the carrier web 21 the label L can be heat sealed to a product or article by heating the coating 30 to the appropriate temperature. The coating 30 is non-tacky except when heated. It is to be understood that the labels of all the disclosed embodiments can be made of a suitable fabric or any other material such as paper, label stock, tag stock, metal foil, plastic or any other suitable flexible material with or without any heat-seal coating.

Figure 6:
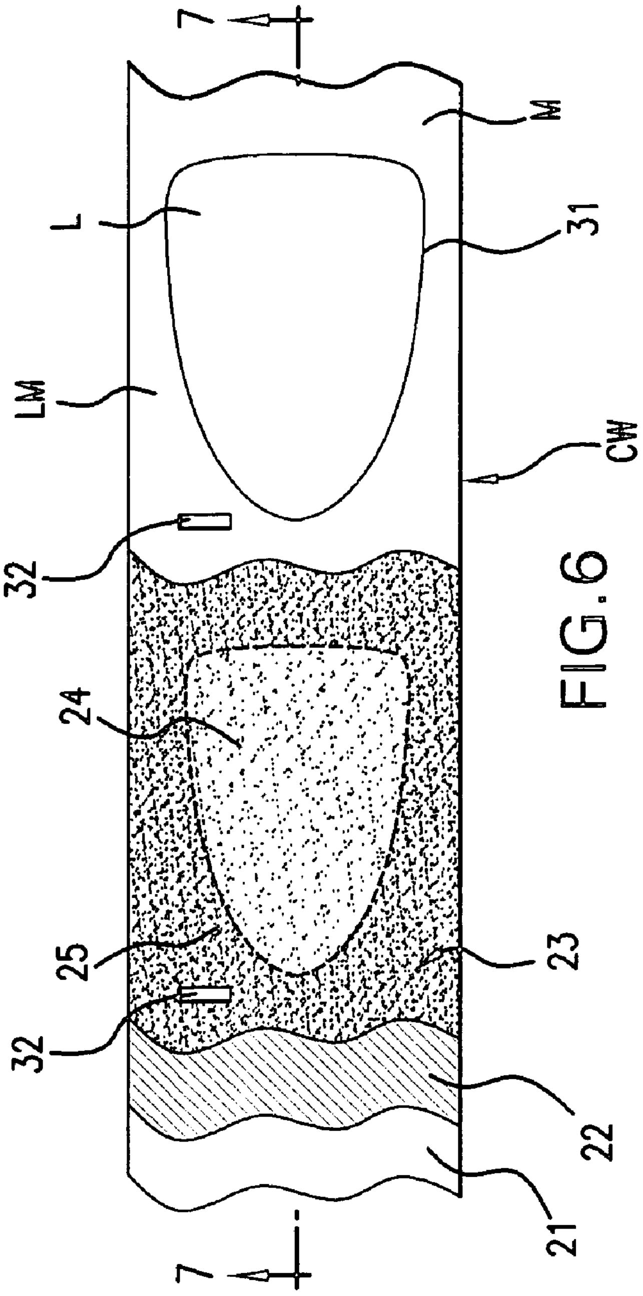
FIG. 6 is a fragmentary top plan view of an alternative embodiment of composite label web.
Figure 7:
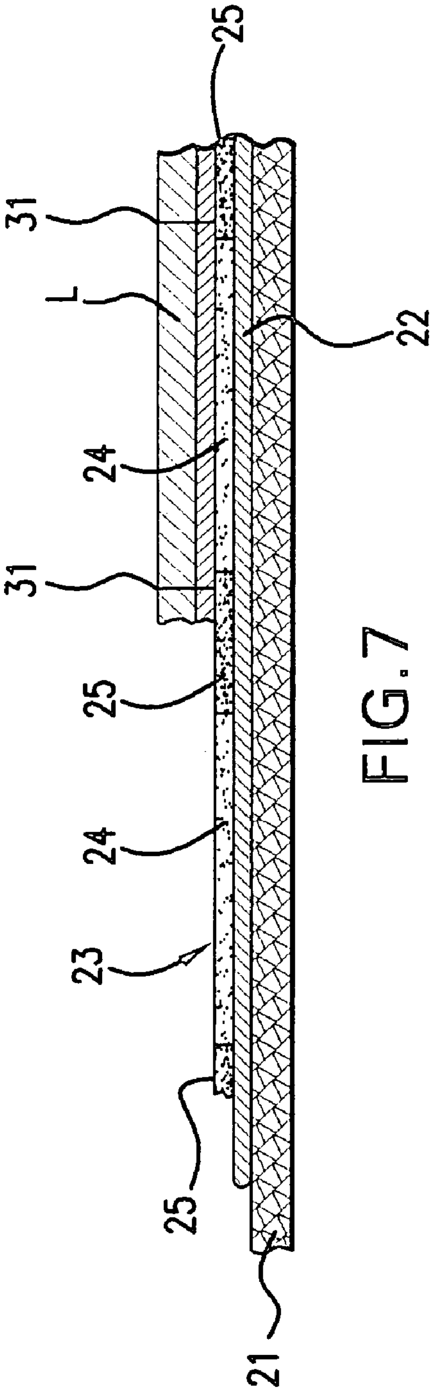
FIG. 7 is a sectional view taken along line 7-7 of FIG. 6.

In making the composite web 20, a web of the label material LM is laminated onto the patterned adhesive deadener coating 23, the labels L are cut from the label material along line 31 and the web of label material surrounding the labels L known as the matrix M (FIGS. 6 and 7) is stripped away, leaving labels L releasably adhered to the carrier web 21. FIG. 6 shows an alternative arrangement wherein the label material is cut as shown at cut line 31 and the matrix or scrap M is allowed to remain as part of the composite web CW. The cuts 31 extend through the label material LM from which the labels L are but preferably not through the carrier 20. Cutting through the carrier would completely blank out the composite label leaving it useable but making it more difficult to handle than in web form. In all other respects the composite label web CW of the embodiment of FIGS. 6 and 7 is the same as the embodiment of FIGS. 1 through 5.

Figure 8:
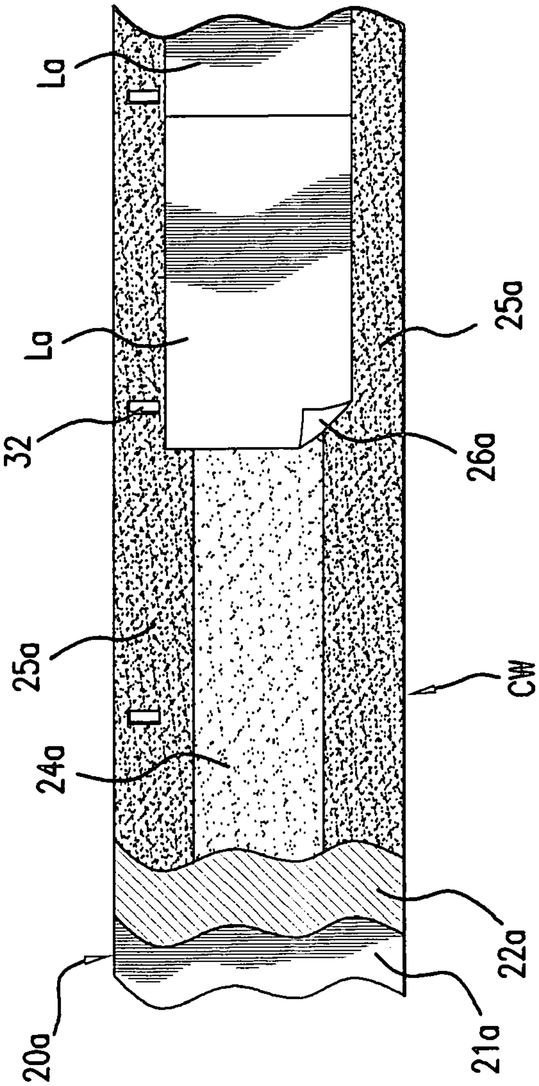
FIG. 8 is a fragmentary top plan view of a composite label web in accordance with yet another embodiment.

The embodiment of FIG. 8 is the same as the embodiment of FIGS. 6 and 7, except as noted below. The composite label web CW includes the carrier 20*a* in the form of a carrier web 21*a* with a coating of pressure sensitive adhesive 22*a* coated with two longitudinally extending zones of heavy adhesive deadener 25*a* shown by heavy stippling outboard a zone of light adhesive deadener 24*a* shown by light stippling. The heavy coating 25*a* renders the adhesive 22*a* non-tacky, whereas the light coating 24*a* releasably adheres the label La to the carrier web 21*a*. The marginal edges 26*a* of the labels La are, thus, preferably not adhered to any adhesive so that labels La are easy to peel from preferably fully deadened adhesive 22*a* on the carrier web 21*a*. As is apparent, the labels La are wider than the continuous zone of light adhesive deadener coating 24*a*.

Figure 9:
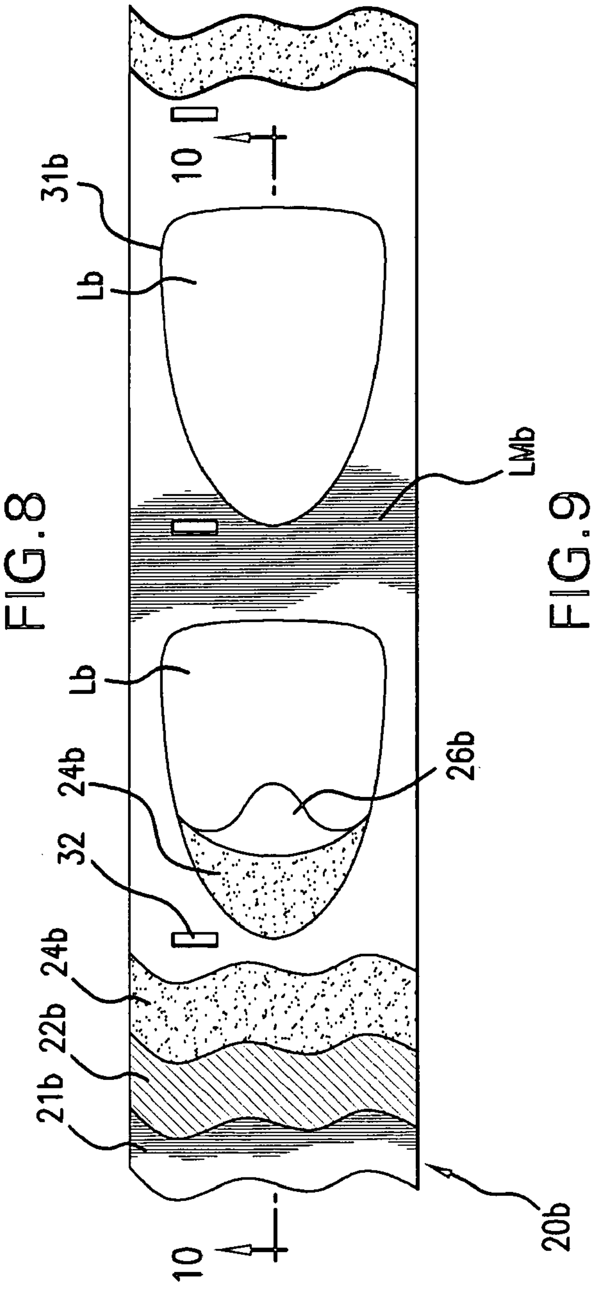
FIG. 9 is a fragmentary top plan view of another embodiment.
Figure 10:
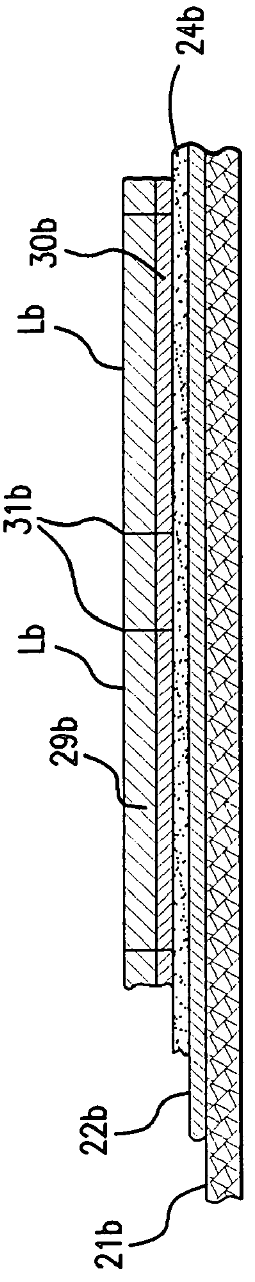
FIG. 10 is a sectional view taken along line 10-10 of FIG. 9.

The embodiment of FIGS. 9 and 10 is the same as the foregoing embodiments except as follows. The carrier 20*b* includes a carrier web 21*b* having a coating of pressure sensitive adhesive 22*b*. A light adhesive deadener coating 24*b* is applied to the Pressure sensitive adhesive coating 22*b*. The coating 24*b* can be uniform or continuous throughout. Labels Lb defined by cuts 31*b* are releasably adhered to the partially deadened adhesive 22*b* and can be readily peeled from the carrier web 21*b*. The waste material or matrix LMb can be allowed to remain with the carrier web 21*b* as shown in FIGS. 9 and 10. The matrix LMb completely masks the tackiness of the partially deadened adhesive 22*b* completely. The label Lb with its heat-seal coating 26*b* can be readily peeled from the partially deadened adhesive 22*b*.

Figure 11:
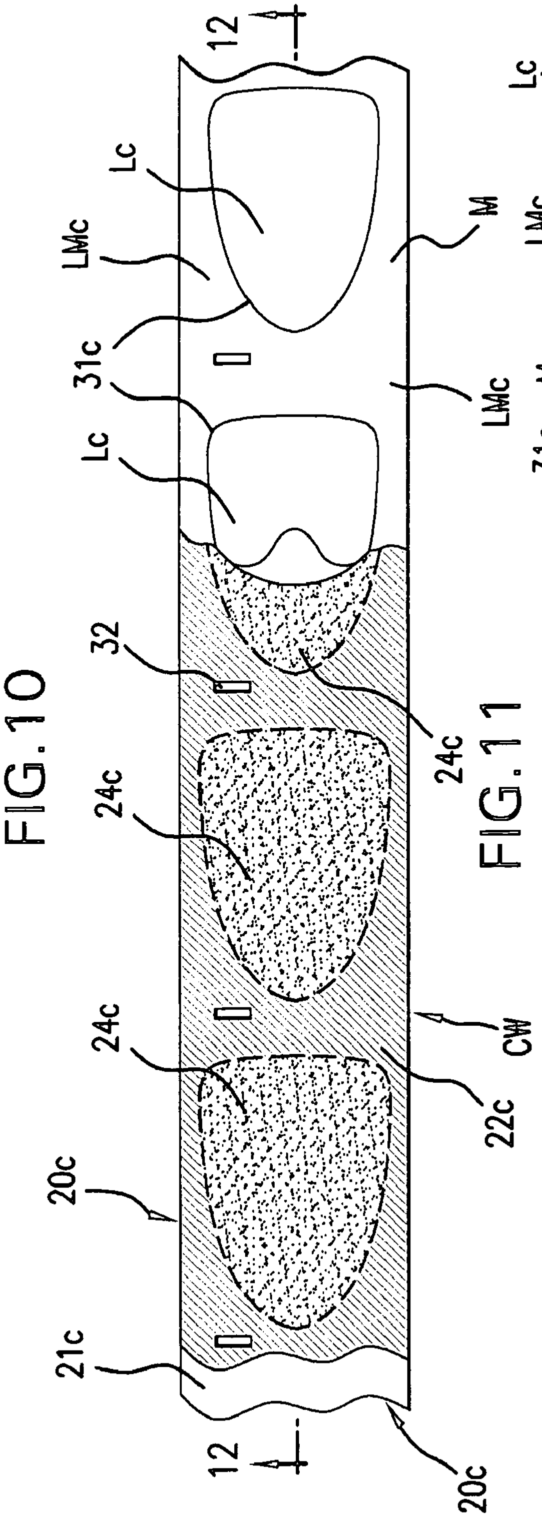
FIG. 11 is a fragmentary top plan view of still another embodiment.
Figure 12:
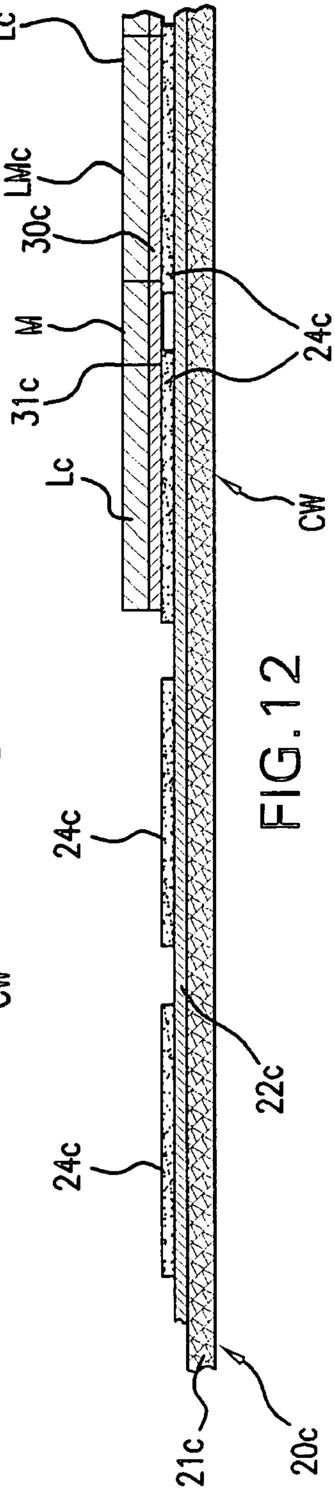
FIG. 12 is a sectional view taken along line 12-12 of FIG. 11.

With reference to the embodiment of FIGS. 11 and 12, which is the same as the other embodiments except as noted, the composite label web CW is comprised of a carrier 20*c* including a longitudinally extending carrier web 21*c* having a uniform coating of a pressure sensitive adhesive 22*c* shown by cross-hatching. There is a pattern of zones or areas of light adhesive deadener coating 24*c* which are similar to but preferably not congruent with labels Lc. The labels Lc are formed by cutting through the label material LMc at cuts or cut lines 31*c*. The matrix M surrounding the labels Lc is simply left in place and the labels Lc can be removed with the matrix M in place. The coating 24*c* extends outside the outer peripheries of the labels Lc to assist in peeling the labels Lc from the carrier web 21*c*. As is apparent the labels Lc are registered with the adhesive-deadener 24*c*, but the adhesive deadener 24*c* extends beyond the outline or profile of the labels Lc, that is, the labels Lc are smaller than the areas or zones of coating 24*c*.

Figure 13:
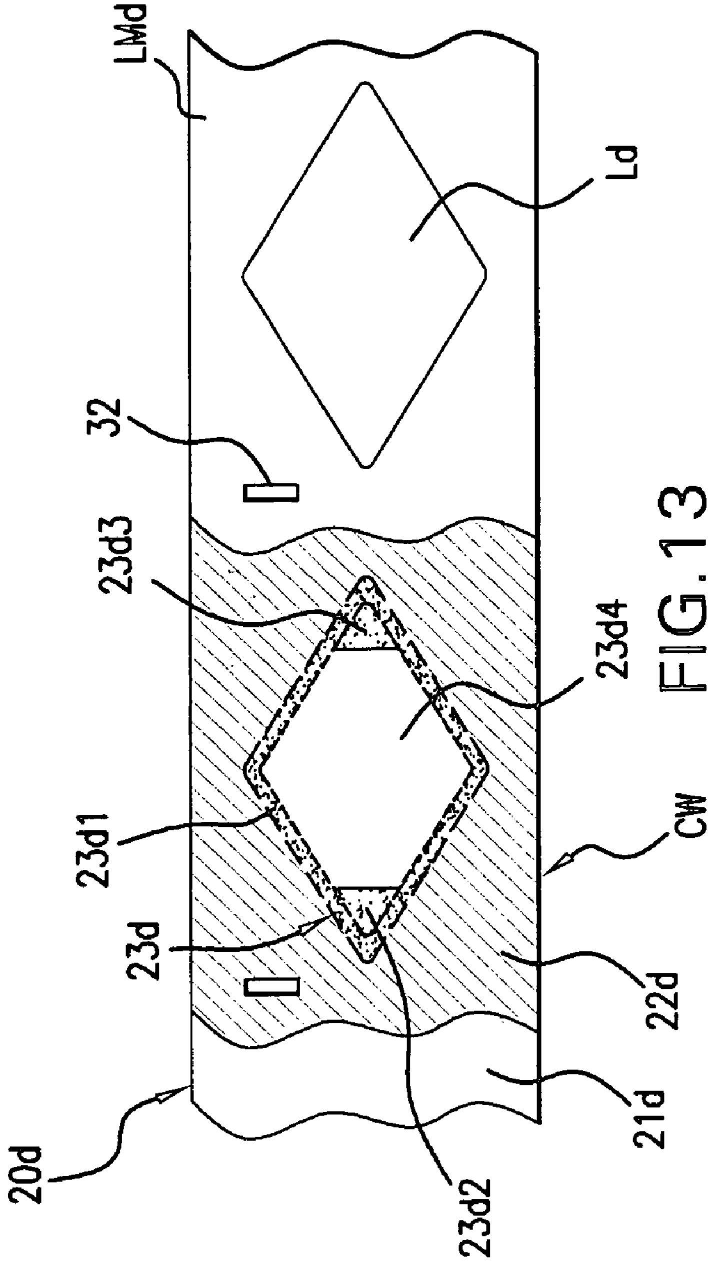
FIG. 13 is a fragmentary top plan view of still another embodiment.

With reference to the embodiment of FIG. 13, which is the same as the other embodiments except as noted, the composite label web CW includes carrier 20*d* in the form of a longitudinally extending carrier web 21*d*. A coating of pressure sensitive or tacky adhesive 22*d* applied to a side of the carrier web 21*d*. There is a pattern of regularly longitudinally spaced areas or zones of adhesive deadener generally indicated at 23*d* comprised of a border of a heavy coating of adhesive deadener 23*d*1 within which are leading and trailing zones 23*d*2 and 23*d*3 and an intervening zone 25*d*4. The outside dimensions of the zone 23*d*1 can be the same as or slightly larger than those of the label Ld, leaving an unadhered border at the marginal edge of the label Ld, making it easy to peel labels Ld from the carrier web 21*d*. The partially deadened adhesive at zones 23*d*2 and 23*d*3 adheres the labels Ld more securely to the carrier web 21*d* than the partially deadened adhesive at the zone 23*d*4, that is, by making the adhesive deadener at zones 23*d*2 and 23*d*3 a lighter coating than the coating of the adhesive deadener at the zone 23*d*4, the leading and trailing edges of the label Ld are held more securely by the partially deadened adhesive 22*d* than the part of the label Ld lying between zones 23*d*2 and 23*d*4. The coating at zones 23*d*2 and 23*d*3 can be considered to be light or of light adhesive deadening quality, while the coating at the zone 23*d*4 can be considered heavier but of moderate or of moderate adhesive deadening quality. No stippling is shown at zone 23*d*4, for clarity. This construction is advantageous because during label production the zone 23*d*3 is at the leading position and the zone 23*d*2 is at the trailing position, and the reverse is true when subsequently the composite web CW is fed through a printer or an applicator. The matrix LMd can be left on the carrier web 21*d* if desired or it can be removed. However, alternatively, removal of the matrix LMd is facilitated by having the entire adhesive 22*d* outward beyond the area of adhesive deadener 23*d*1 be coated with a heavy coating of adhesive deadener, the same as in area 23*d*1. It is apparent that the peel characteristics of the labels are predetermined by varying the amount of adhesive deadener distributed in each of the zones 23*d*1, 23*d*2, 23*d*3 and 23*d*4. This uneven coating pattern or uneven distribution enables the user to have the desired label peel characteristics. Even the adhesive deadener patterns in the embodiments of FIGS. 1 through 10 are considered to have varied or uneven distribution.

Figure 14:
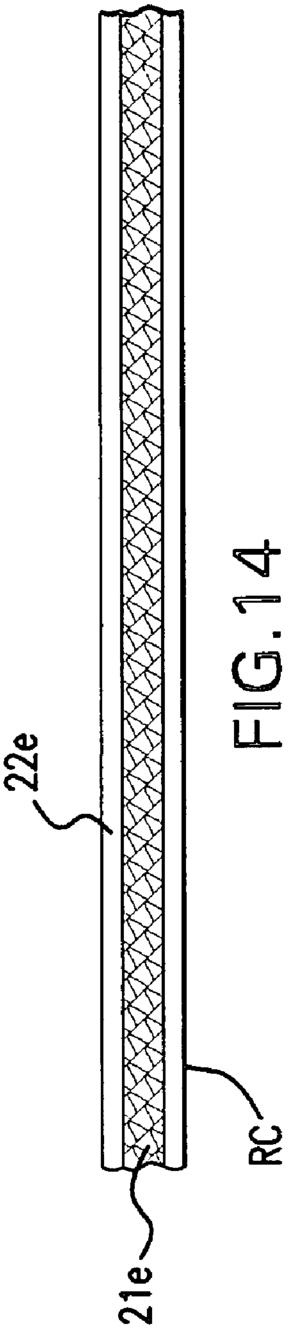
FIG. 14 is a sectional view of an alternative carrier web for use in all the other embodiments.

FIG. 14 shows an alternate form of a carrier web 21*e* which can be used with any one of the above described embodiments. Instead of starting with a linered web such as the webs 21, 21*a*, 21*b*, 21*c*, or 21*d* each of which has been coated with a pressure sensitive adhesive from which a release liner (not shown) has been stripped, a linerless web can be used as shown in FIG. 14 comprised of a carrier web or liner 21*e* or the like, a coating of pressure sensitive adhesive 22*e* and a release coating RC comprised, for example, of silicone. The web 21*e* can be constructed of the same materials as the carrier web 21. Such a web as shown in FIG. 14, can be wound into roll and subsequently used in place of the adhesive-coated carrier webs 21, 21*a*, 21*b*, 21*c* or 21*d*.

The composite label webs CW disclosed herein have suitable registration means registered with the labels for use in printers and/or label applicators. Although such means are shown to be slots 32 entirely through the composite web CW, registration can instead be accomplished by printed marks, side notches, varying opacity and the like.

By way of example, not limitation, a useful adhesive deadener comprises a UV clear coating (Gloss Coat 2-RVG 000116) mixed with a UV Flexo Black Ink (RSL 400837) available from Water Ink Technologies, Lincolnton, N.C. The black ink colorant in the adhesive deadener 23 makes the pattern of the adhesive deadener 23 visible during production which aids in registering the label-defining cuts 31, 31*a*, 31*b*, and 31*c* in the label material LM, LMb, LMc and LMd with the adhesive deadener areas which underlie the labels being formed.

Other embodiments and modifications of the invention will suggest themselves to those skilled in the art, and all such of these as come within the spirit of this invention are included within its scope as best defined by the appended claims.

We claim:

1. A composite label, comprising:

a carrier having a coating of pressure sensitive adhesive on a face thereof, a patterned adhesive deadener coating on the pressure sensitive adhesive wherein the patterned adhesive deadener coating includes a heavy adhesive deadener coating and a light adhesive deadener coating, a label having an exposed face and having a face with a coating of heat-activatable non-tacky adhesive adhered to the adhesive deadener coating, wherein at least some of the adhesive deadener coating between the non-tacky adhesive coating and the pressure sensitive adhesive coating includes the light adhesive deadener coating to releasably adhere the label to the carrier, the label having a marginal edge terminating at a periphery of the label, and wherein the deadener coating outside the periphery of the label includes the heavy adhesive deadener coating to render the pressure sensitive adhesive outside the periphery of the label substantially non-tacky.

2. A composite label as defined in claim 1, including a release coating on the exposed face of the label.

3. A composite label as defined in claim 1, wherein the heavy adhesive deadener coating extends around the entire periphery of the label.

4. A composite label as defined in claim 1, wherein the heavy adhesive deadener coating extends around the entire periphery of the label and to within the marginal edge of the label.

5. A composite label as defined in claim 1, wherein the heavy adhesive deadener coating extends beyond two opposite edges of the label.

6. A composite label as defined in claim 1, wherein the heavy adhesive deadener coating extends beyond two edges of the label and to within marginal edges of the label.

7. A composite label as defined in claim 1, wherein the non-tacky adhesive is in contact with the light adhesive deadener coating.

8. A composite label as defined in claim 1, wherein the label is comprised of fabric.

9. A composite label web, comprising:

a longitudinally extending carrier web having a coating of pressure sensitive adhesive on a face thereof, a patterned adhesive deadener coating on the pressure sensitive adhesive wherein the patterned coating includes a heavy adhesive deadener coating and a light adhesive deadener coating, labels disposed along the carrier web wherein each label has an exposed face and an opposite face with a coating of heat activatable non-tacky adhesive adhered to the adhesive deadener coating, the labels having peripheries, wherein at least some of the adhesive deadener coating between the non-tacky adhesive coating and the pressure sensitive adhesive coating includes the light adhesive deadener coating to releasably adhere the labels to the carrier web, and wherein the adhesive deadener coating outside the peripheries of the labels includes the heavy adhesive deadener coating to render the pressure sensitive adhesive outside the peripheries of the labels substantially non-tacky.

10. The composite label web as defined in claim 9, the labels having marginal edges terminating at their peripheries, wherein the heavy coating extends to within the marginal edges of the labels.

11. A composite label web as defined in claim 9, wherein the labels are comprised of fabric.

12. A composite label web, comprising:

a carrier web having a coating of pressure sensitive adhesive on a face thereof, a web of label material, cuts through the label material to define labels, each label having an exposed face and having an opposite face with a coating of heat-activatable non-tacky adhesive, and adhesive deadener in zones on the pressure sensitive adhesive but leaving at least some of the pressure sensitive adhesive tacky enough to releasably adhere the non-tacky adhesive on the labels to the pressure sensitive adhesive on the carrier web.

13. A composite label web, comprising:

a longitudinally extending carrier web having a coating of pressure sensitive adhesive on a face thereof, a longitudinally extending web of label material, an adhesive deadener coating on the pressure sensitive adhesive along the carrier web, cuts in the label material to define labels registered with the adhesive deadener coating along the carrier web, each label having an exposed face and having an opposite face with a coating of heat-activatable non-tacky adhesive against the adhesive deadener coating, and the adhesive deadener facilitating removal of the labels from the carrier web.

14. A composite label web as defined in claim 13, the adhesive deadener coating having zones with leading and trailing edges, wherein at least one of the marginal leading and trailing edges of each zone has a light coating of the adhesive deadener and at least part of the remainder has a moderate adhesive deadener coating.

15. A composite label web as defined in claim 13, wherein the adhesive deadener coating is disposed at zones along the carrier, and the labels having a peel characteristic predetermined by the amount of adhesive deadener coating distributed in each of the zones.

16. A composite label web as defined in claim 13, the labels having peripheries wherein the adhesive deadener coating terminates short of at least a portion of the peripheries of the labels.

17. A composite label web as defined in claim 15, wherein the adhesive deadener coating in each zone is in an uneven pattern.

18. A composite label web as defined in claim 15, wherein at least some of the adhesive deadener coating in each zone is evenly distributed.

19. A composite label web as defined in claim 13, the labels having peripheries, wherein there is an absence of adhesive deadener coating on the pressure sensitive adhesive outside the peripheries of the labels.

20. A composite label web as defined in claim 13, including a colorant on or in the adhesive deadener coating to render the adhesive deadener coating of a color different from the color of the adhesive.

* * * * *